US010402729B2

(12) United States Patent
Wang

(10) Patent No.: US 10,402,729 B2
(45) Date of Patent: Sep. 3, 2019

(54) PATH DETERMINATION USING ROBUST OPTIMIZATION

(71) Applicant: SAP SE, Walldorf (DE)

(72) Inventor: Chen Wang, Singapore (SG)

(73) Assignee: SAP SE, Walldorf (DE)

( * ) Notice: Subject to any disclaimer, the term of this patent is extended or adjusted under 35 U.S.C. 154(b) by 655 days.

(21) Appl. No.: 15/144,862

(22) Filed: May 3, 2016

(65) Prior Publication Data

US 2017/0323194 A1  Nov. 9, 2017

(51) Int. Cl.
*G06N 5/00* (2006.01)

(52) U.S. Cl.
CPC .................. *G06N 5/003* (2013.01)

(58) Field of Classification Search
CPC .............................. G06N 5/003; Y04S 10/54
USPC ........................................................ 706/26
See application file for complete search history.

(56) References Cited

U.S. PATENT DOCUMENTS

| 2004/0122859 | A1* | 6/2004 | Gavra | H01L 22/20 |
| 2009/0175171 | A1* | 7/2009 | Nikolova | H04L 45/12 370/238 |
| 2011/0206371 | A1* | 8/2011 | Tajima | H04B 10/2513 398/29 |
| 2015/0237122 | A1* | 8/2015 | Wang | H04L 67/025 709/227 |

OTHER PUBLICATIONS

Routing Optimization under Uncertainty Jaillet et al. (Year: 2015).*
Optimal Routing for Maximizing the Travel Time Reliability Fan et al. (Year: 2006).*
Brian C. Dean, Algorithms for Minimum-Cost Paths in Time-Dependent Networks with Waiting Policies, Networks, Aug. 2004, pp. 41-46, vol. 44 Issue 1, Wiley Periodicals, Inc., New York, NY, USA.
S. Travis Waller and Athanasios K. Ziliaskopoulos, On the Online Shortest Path Problem with Limited Arc Cost Dependencies, Networks, Dec. 2002, pp. 216-227, vol. 40 Issue 4, Wiley Periodicals, Inc., New York, NY, USA.
Y. Y. Fan et al., Shortest Paths in Stochastic Networks with Correlated Link Costs, Computers and Mathematics with Applications, May 2005, pp. 1549-1564, vol. 49 Issues 9-10, Elsevier Ltd.

(Continued)

*Primary Examiner* — Robert A Cassity
*Assistant Examiner* — Ababacar Seck
(74) *Attorney, Agent, or Firm* — Jones Day

(57) ABSTRACT

A technology for path determination using robust optimization is provided. In accordance with one aspect, a network graph of a network is generated. The network graph comprises nodes corresponding to points in the network, and edges which connect the nodes. Costs for each edge of the network are determined and modeled using reference point, upper bound and lower bound parameters. A user input which includes a source node, destination node, and cost target may be received from a client device. A resultant path connecting the source node and destination node are determined by solving a target-oriented robust optimization problem, which optimizes a cost of the resultant path based on the modeled costs of the edges. The resultant path is displayed on a user interface of the client device.

16 Claims, 7 Drawing Sheets

(56) References Cited

OTHER PUBLICATIONS

Michel Gendreau et al., Invited Review Stochastic Vehicle Routing, European Journal of Operational Research, Jan. 6, 1996, pp. 3-12, vol. 88 Issue 1, Elsevier Science B. V.
Xiangyong Li et al., Vehicle Routing Problems with Time Windows and Stochastic Travel and Service Times: Models and Algorithm, International Journal of Production Economics, May 2010, pp. 137-145, vol. 125 Issue 1, Elsevier B. V.
Duygu Tas et al., Vehicle Routing Problem with Stochastic Travel Times Including Soft Time Windows and Service Costs, Computers & Operations Research, Jan. 2013, pp. 214-224, vol. 40 Issue 1, Elsevier Ltd.
Y. Y. Fan et al., Arriving on Time, Journal of Optimization Theory and Applications, Dec. 2005, pp. 497-513, vol. 127 Issue 3, Springer Science+Business Media, Inc.
Yueyue Fan and Yu Nie, Optimal Routing for Maximizing the Travel Time Reliability, Networks and Spatial Economics, Sep. 2006, pp. 333-344, vol. 6 Issue 3-4, Springer Science + Business Media, LLC.
A. Ben-Tal and A. Nemirovski, Robust Convex Optimization, Mathematics of Operations Research, Nov. 1998, pp. 769-805, vol. 23 Issue 4, INFORMS Institute for Operations Research and the Management Sciences, Linthicum, Maryland, USA.
A. Ben-Tal and A. Nemirovski, Robust Solutions of Uncertain Linear Programs, Operations Research Letters, Aug. 1999, pp. 1-13, vol. 25 Issue 1, Elsevier Science B.V.
Aharon Ben-Tal and Arkadi Nemirovski, Robust Solutions of Linear Programming Problems Contaminated with Uncertain Data, Mathematical Programming, Sep. 2000, pp. 411-424, vol. 88 Issue 3, Springer-Verlag.
Dimitris Bertsimas and Melvyn Sim, The Price of Robustness, Operations Research, Feb. 1, 2004, pp. 35-53, vol. 52 Issue 1, INFORMS Institute for Operations Research and the Management Sciences, Linthicum, Maryland, USA.
Dimitris Bertsimas and Melvyn Sim, Tractable Approximations to Robust Conic Optimization Problems, Mathematical Programming, Jun. 2006, pp. 5-36, vol. 107 Issue 1-2, Springer-Verlag.
Dimitris Bertsimas et al., Robust Linear Optimization Under General Norms, Operations Research Letters, Nov. 2004, pp. 510-516, vol. 32 Issue 6, Elsevier B. V.
Laurent El Ghaoui and Herve Lebret, Robust Solutions to Least-Squares Problems With Uncertain Data, SIAM Journal on Matrix Analysis and Applications, Oct. 1997, pp. 1035-1064, vol. 18 Issue 4, Society for Industrial and Applied Mathematics Philadelphia, PA, USA.
Laurent El Ghaoui et al., Robust Solutions to Uncertain Semidefinite Programs, SIAM Journal on Optimization, 1998, pp. 33-52, vol. 9 Issue 1, Society for Industrial and Applied Mathematics Philadelphia, PA, USA.
Chen Wang et al., Convergence Properties of Constrained Linear System Under MPC Control Law Using Affine Disturbance Feedback, Automatica, Jul. 2009, pp. 1715-1720, vol. 45 Issue 7, Elsevier Ltd.
Richard Bellman, On a Routing Problem, Dec. 20, 1956, pp. 1-6, P-1000, The Rand Corporation, Santa Monica, California, USA.
E. W. Dijkstra, A Note on Two Problems in Connexion with Graphs, Numerische Mathematik, Jun. 11, 1959, pp. 269-271, vol. 1 Issue 1, Springer-Verlag New York, Inc., Secaucus, NJ, USA.
S. E. Dreyfus, An Appraisal of Some Shortest-Path Algorithms, This Rand Memorandum RM-5433-1-PR, Sep. 1968, pp. 1-39, The Rand Corporation, Santa Monica, California, USA.
Pitu B. Mirchandani, Shortest Distance and Reliability of Probabilistic Networks, Computers & Operations Research, Dec. 1976, pp. 347-355, vol. 3 Issue 4, Pergamon Press, Great Britain.
H. Frank, Shortest Paths in Probabilistic Graphs, Operations Research, Aug. 1969, pp. 583-599, vol. 17 Issue 4, INFORMS Institute for Operations Research and the Management Sciences, Linthicum, Maryland, USA.
C. Elliott Sigal et al., The Stochastic Shortest Route Problem, Operations Research, Sep.-Oct. 1980, pp. 1122-1129, vol. 28 Issue 5, INFORMS Institute for Operations Research and the Management Sciences, Linthicum, Maryland, USA.
V. G. Kulkarni, Shortest Paths in Networks with Exponentially Distributed Arc Lengths, Networks, Fall 1986, pp. 255-274, vol. 16 Issue 3, John Wiley & Sons, Inc., New York, NY, USA.
Kelly J. Hayhurst and Douglas R. Shier, A Factoring Approach for the Stochastic Shortest Path Problem, Operations Research Letters, Aug. 1991, pp. 329-334, vol. 10 Issue 6, Elsevier Science Publishers B. V., North Holland.
Gehan A. Corea and Vidyadhar G. Kulkarni, Shortest Paths in Stochastic Networks with ARC Lengths Having Discrete Distributions, May 1993, pp. 175-183, vol. 23 Issue 3, John Wiley & Sons, Inc., New York, NY, USA.
Ronald Prescott Loui, Optimal Paths in Graphs with Stochastic or Multidimensional Weights, Communications of the ACM, Sep. 1983, pp. 670-676, vol. 26 Issue 9, ACM, New York, NY, USA.
Amir Eiger et al., Path Preferences and Optimal Paths in Probabilistic Networks, Technical Notes, Feb. 1985, pp. 75-84, vol. 19 Issue 1, INFORMS Institute for Operations Research and the Management Sciences, Linthicum, Maryland, USA.
Ishwar Murthy and Sumit Sarkar, A Relaxation-Based Pruning Technique for a Class of Stochastic Shortest Path Problems, Transportation Science, Aug. 1996, pp. 220-236, vol. 30 Issue 3, INFORMS Institute for Operations Research and the Management Sciences, Linthicum, Maryland, USA.
Ishwar Murthy and Sumit Sarkar, Stochastic Shortest Path Problems with Piecewise-Linear Concave Utility Functions, Management Science, Nov. 1998, pp. S125-S136, vol. 44 Issue 11, Part 2 of 2, INFORMS Institute for Operations Research and the Management Sciences, Linthicum, Maryland, USA.
Randolph W. Hall, The Fastest Path through a Network with Random Time-Dependent Travel Times, Transportation Science, Aug. 1986, pp. 182-188, vol. 20 Issue 3, INFORMS Institute for Operations Research and the Management Sciences, Linthicum, Maryland, USA.
Liping Fu and L. R. Rilett, Expected Shortest Paths in Dynamic and Stochastic Traffic Networks, Transportation Research Part B: Methodological, Sep. 1998, pp. 499-516, vol. 32 Issue 7, Elsevier Science Ltd., Great Britain.
Elise D. Miller-Hooks and Hani S. Mahmassani, Least Possible Time Paths in Stochastic Time-Varying Networks, Computers & Operations Research, Dec. 1998, pp. 1107-1125, vol. 25 Issue 12, Elsevier Science Ltd., Great Britain.
Elise D. Miller-Hooks and Hani S. Mahmassani, Least Expected Time Paths in Stochastic, Time-Varying Transportation Networks, Transportation Science, May 2000, pp. 198-215, vol. 34 Issue 2, INFORMS Institute for Operations Research and the Management Sciences, Linthicum, Maryland, USA.

* cited by examiner

Algorithm 1 Binary search for solution of Problem (6)

1: procedure $TRO_{BS}(\tau, i_{max})$
2:     $LB = 0, UB = 1, i = 1$
3:     if optimum of Problem (8) is less than $\tau$ then Return infeasible
4:     end if
5:     if optimum of Problem (8) with $\hat{c}_{ij}$ replaced by $\bar{c}_{ij}$ is no less than $\tau$ then Return 1
6:     end if
7:     while $i \leq i_{max}$ do
8:       if optimum of Problem (8) with $\hat{c}_{ij}$ replaced by $\hat{c}_{ij} + (\bar{c}_{ij} - \hat{c}_{ij}) * (UB - LB)/2$ is no less than $\tau$ then LB =(UB+LB)/2
9:       else UB =(UB+LB)/2
10:       end if
11:       $i = i + 1$
12:     end while
13:     Return $LB$
14: end procedure

*Fig. 4*

PATH DETERMINATION USING ROBUST OPTIMIZATION

TECHNICAL FIELD

The present disclosure relates to computer systems, and more specifically, to a system for path determination using robust optimization.

BACKGROUND

Shortest path problem is important for many applications in engineering, logistics and other sciences. Usually, a network consisting of a number of nodes and arcs which connect the nodes is considered. Certain costs are associated with the arcs to describe distance, travel time and/or other measurement of the arcs. Given a starting node and a destination node, the general problem is to find a path connecting the two nodes and at the same time minimizing the cost of the path. In most cases, all parameters including the structure of the network and costs of arcs are assumed fixed and known, and such problem is referred to as a Deterministic Problem (DP).

Although the algorithms for the determination of the shortest path in a deterministic problem are quite efficient, the real-world problems are always far from deterministic. For example, the travel time within a transportation network is always stochastic and/or time-dependent. Hence, the solution of a deterministic problem may have poor performance in a stochastic setting.

Furthermore, the cost of path such as the travel time, for example, within a traffic network is subject to uncertainty. Typically, the uncertainty is modeled using a random variable. A common assumption in conventional techniques for determining optimal paths in stochastic networks is that the distribution function of the underlying uncertain factor such as the travel time is known no matter stationary or time-varying. The distribution function plays an important role, for example, in the computation of the distribution of total travel time and the probability of fulfilling certain travel time target. In reality the distribution function may not be accurate as it is obtained from limited historical data, and sometimes the distribution is totally unavailable. In such cases, the performance of a solution that is tuned according to a presumed distribution can deteriorate a lot in practice.

SUMMARY

A technology for path determination using robust optimization is provided. In accordance with one aspect, a network graph of a network is generated. The network graph includes nodes corresponding to points in the network, and edges which connect the nodes. Costs for each edge of the network are determined and modeled using reference point, upper bound and lower bound parameters. A user input which includes a source node, destination node, and cost target may be received from a client device. A resultant path connecting the so de and destination node are determined by solving a target-oriented robust optimization problem, which optimizes a cost of the resultant path based on the modeled costs of the edges. The resultant path is displayed on a user interface of the client device.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein:

FIG. 4 shows an exemplary algorithm illustrating a binary search procedure for solving a TRO problem;

DETAILED DESCRIPTION

Figure 1:
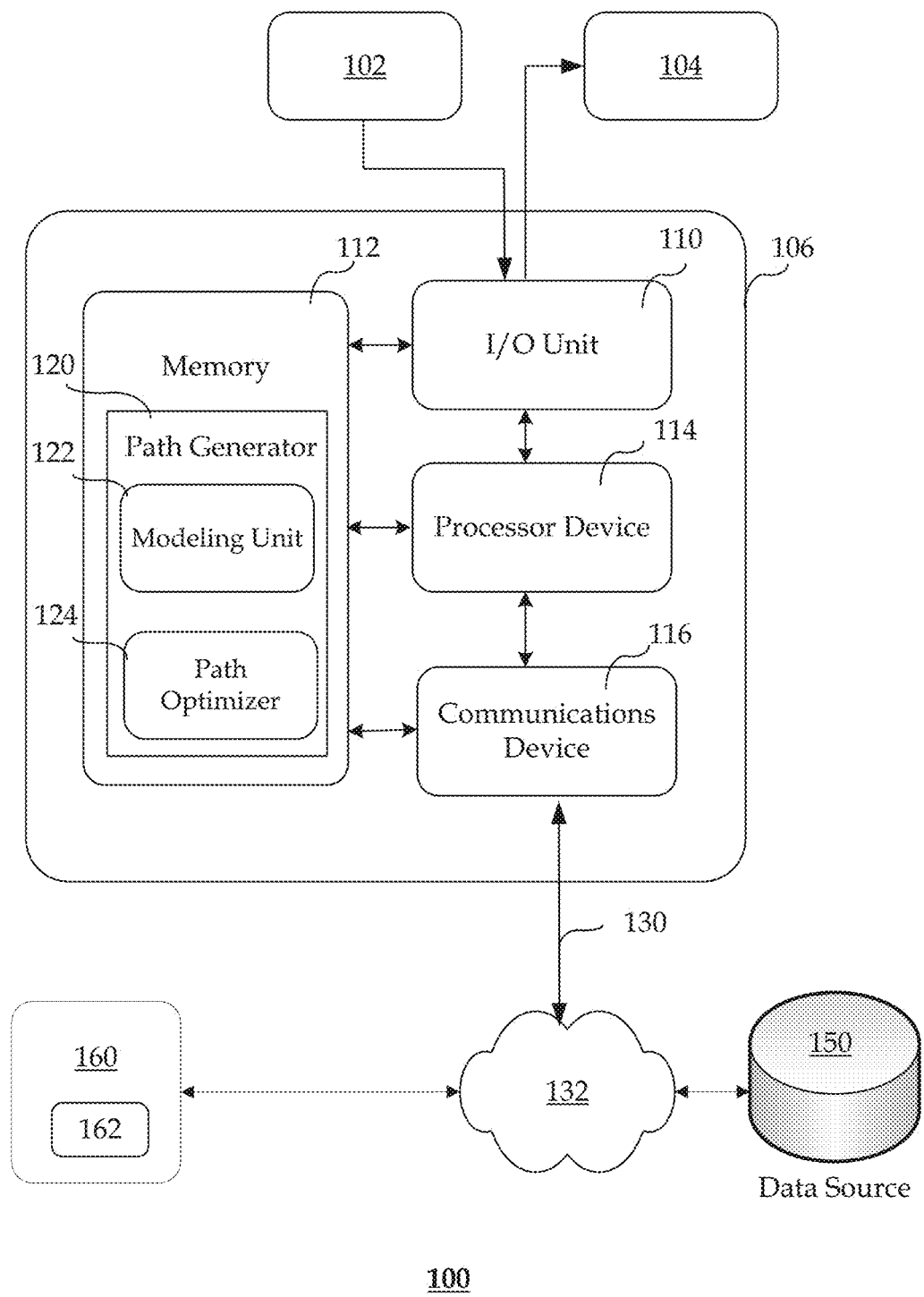
FIG. 1 is a block diagram illustrating an exemplary system.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

Described herein is a framework using a robust optimization technique for path determination in a stochastic network. In accordance with one aspect, the framework models uncertain costs of the network using a reference point (or nominal value) and upper bound and lower bound parameters of the uncertain costs. The uncertain costs, in one implementation, may be the travel time costs. For example, the framework uses a reference point and upper bound and lower bound parameters to model travel time costs in a traffic network to determine an optimal route. The travel time may be historical data which is collected from the traffic network. Alternatively, the travel time data may be real-time data. The framework solves a robust optimization problem based on the modeled costs and outputs a resultant path based on the solution of the robust optimization problem.

In some implementations, a cost target is considered and the framework optimizes the possibility of fulfilling the cost target using a target-oriented robust optimization (TRO) technique. For example, a travel time target input is provided and the framework performs calculations using the target-oriented robust optimization technique to optimize the possibility of fulfilling the travel time target. This enhances the travel time reliability. The target-oriented robust optimization problem is solved in order to determine an optimal path in the network. The solution is robust in that a pre-specified travel time target can be guaranteed for an uncertainty set that is as large as possible. In some implementations, it may be unnecessary to solve the robust optimization problem itself; rather its solution can be obtained by solving and updating a deterministic problem based on the defined TRO problem. The deterministic problem may be solved using existing algorithms such as, for example, Dijkstra. This enables the framework to be applied to a large variety of problems. Furthermore, as the framework does not require distribution information of the uncertain factors, the generated solution is robust against distributional uncertainty.

For purposes of illustration, the framework is discussed in the context of route determination in a stochastic traffic network with uncertain travel times. However, it should be appreciated that the framework may be applied to path determination problems in any weighted stochastic network. For example, the framework may be applied in a social network to determine relationships by various modifications of the techniques discussed herein.

The framework described herein may be implemented as a method, computer-controlled apparatus, a computer process, a computing system, or as an article of manufacture such as a computer-usable medium.

FIG. 1 shows a block diagram illustrating an exemplary system 100 that may be used to implement the framework described herein. System 100 includes a computer system 106 communicatively coupled to an input device 102 (e.g., keyboard, touchpad, microphone, camera, etc.) and an output device 104 (e.g., display device, monitor, printer, speaker, etc.). Computer system 106 may include a communications device 116 (e.g., a modem, wireless network adapter, etc.) for exchanging data with a network 132 using a communications link 130 (e.g., telephone line, wireless or wired network link, cable network link, etc.). The network may be a local area network (LAN) or a wide area network (WAN). The computer system 106 may be communicatively coupled to one or more client devices 160 via the network. For example, the computer system 106 may act as a server and operate in a networked environment using logical connections to one or more client devices 160.

Client devices 160 may include components similar to the computer system 106, and may be in the form of a mobile device, tablet computer, communication device, desktop computer, browser-based device, etc. A user at the client device 160 may interact with a user interface component 162 to communicate with the computer system 106. For example, the interface may be used to access various applications in the computer system 106.

The computer system 106 may be communicatively coupled to one or more data sources 150. Data sources may be, for example, any database (e.g., relational database, in-memory database, etc.), an entity (e.g., set of related records), or data sets or data files included in a database. Alternatively, the database may be stored in a memory device of computer system 106.

The data source contains data or information used by a path generator 120. In one implementation, the data source contains information of a network which may be used to develop a network graph of the network. For example, the data source contains information of a traffic network for building a graph of the traffic network. The traffic network, for example, may encompass a predefined geographical area of interest. Providing other geographical coverage of the traffic network may also be useful. The traffic network data includes, for example, points in a road network (e.g., buildings, bus stops, train stations, landmarks), distances between the points, routes within the network and travel time of vehicles between the points. Providing other traffic data for the path generator may also be useful.

In one implementation, the traffic network data includes historical travel data of the traffic network. The historical data may be the recorded information of vehicles. For example, the historical travel data may be recorded data of public transportation systems. In other implementations, the data may be real time data such as real time travel data collected as a commuter completes his or her trip. For example, the real time travel data may be collected via a sensor device mounted on a vehicle on which a commuter rides. Depending on the application, providing other types of data in the data source may also be useful. For example, the data source may include information of a social network such as individuals and relationships between individuals in the case of path determination in a social network.

It should be appreciated that the different components and sub-components of the computer system 106 may be located on different machines or systems. It should further be appreciated that the components of the client devices 160 may also be located on the computer system 106, or vice versa.

Computer system 106 includes a processor device or central processing unit (CPU) 114, an input/output (I/O) unit 110, and a memory device 112. Other support circuits, such as a cache, a power supply, clock circuits and a communications bus, may also be included in computer system 106. In addition, any of the foregoing may be supplemented by, or incorporated in, application-specific integrated circuits. Examples of computer system 106 include a smart device (e.g., smart phone), a handheld device, a mobile device, a personal digital assistance (PDA), a workstation, a server, a portable laptop computer, another portable device, a minicomputer, a mainframe computer, a storage system, a dedicated digital appliance, a device, a component, other equipment, or some combination of these capable of responding to and executing instructions in a defined manner.

Memory device 112 may be any form of non-transitory computer-readable media, including, but not limited to, static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof.

Memory device 112 serves to store machine-executable instructions, data, and various programs, such as the path generator 120 for implementing the techniques described herein, all of which may be processed by processor device 114. As such, the computer system 106 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C, C++, Java, etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In one implementation, the path generator 120 includes a modeling unit 122 and a path optimizer unit 124. The path generator 120 provides path recommendations to a user via the client device 160. The path generator 120 provides path recommendations in response to user input of parameters to a path determination problem to be solved. In one implementation, the path recommendations may be a route recommendation in a traffic network. The recommended route, in one implementation, may be an optimal route in the traffic network. In another implementation, the path generator may be employed for solving a path determination problem in a social network. The path generator, for example, may determine how fast a message can be transferred between individuals in the social network using the robust optimization framework. Depending on the application, the path generator generates recommendations to the user based on the determined optimal path.

The modeling unit 122 serves to construct or generate a network graph of the network of interest. In one implementation, the modeling unit builds a network graph (or transportation graph) of a traffic network. The network graph may be built based on information of the traffic network such as routes in the traffic network, points or locations in the traffic network, distances between the points, travel time between the points, road tolls, for example. Constructing the network graph using other information may also be useful. The network graph, in one implementation, may be constructed to include nodes representing entities such as road junctions or locations in the traffic network, and arcs or edges connecting the nodes. Each edge may be associated with weights which correspond, for example, to the length of the associated road segment, the time needed to traverse the segment or the cost of traversing the segment.

In one implementation, the modeling unit models an uncertain cost such as the travel time costs between the nodes in the traffic network. The modeling unit models the travel time costs using the travel time information in the network and associates the modeled travel time costs to the edges of the network graph. The travel time costs associated to the edges may be used to determine the travel time from a source location to a destination via an optimal path in the network graph. The modeling unit, in one implementation, models the travel time costs for each edge using reference point and lower and upper bounds parameters. For example, the modeling unit determines the reference point and upper and lower bounds value of a sample set of travel time for each edge.

In another implementation, the modeling unit constructs a network graph of a social network. For example, each node in the network may represent a person. Representing the node with other entities or multiple types of entities may also be useful. Each edge connects an individual with each of his or her contacts, and the weight of the edges may be used to determine the time for a message to be delivered from the individual to his or her contacts. The weight of the edges depends on how the individual usually interacts with his or her contacts, for example, through a social networking site (e.g., Facebook), phone call, face-to-face chat, email. Given a source individual and destination contact in the network, the network graph may be used to determine how fast a message can be transferred from the source to the destination.

As for the path optimizer unit 124, it receives user input containing a starting or source node s, destination node d, and cost target, and solves a robust optimization problem for determining an optimal path in the network. In one implementation, the path optimizer unit solves a target-oriented robust optimization (TRO) problem to determine a path that satisfies the cost target with the highest probability. The path optimizer unit determines whether the edges in the constructed network graph are part of the resultant path. All the edges that are determined to be part of the resultant path form a path connecting the source and the destination. The path optimizer unit outputs the path defined by the solution of the target-oriented robust optimization problem.

Figure 2:
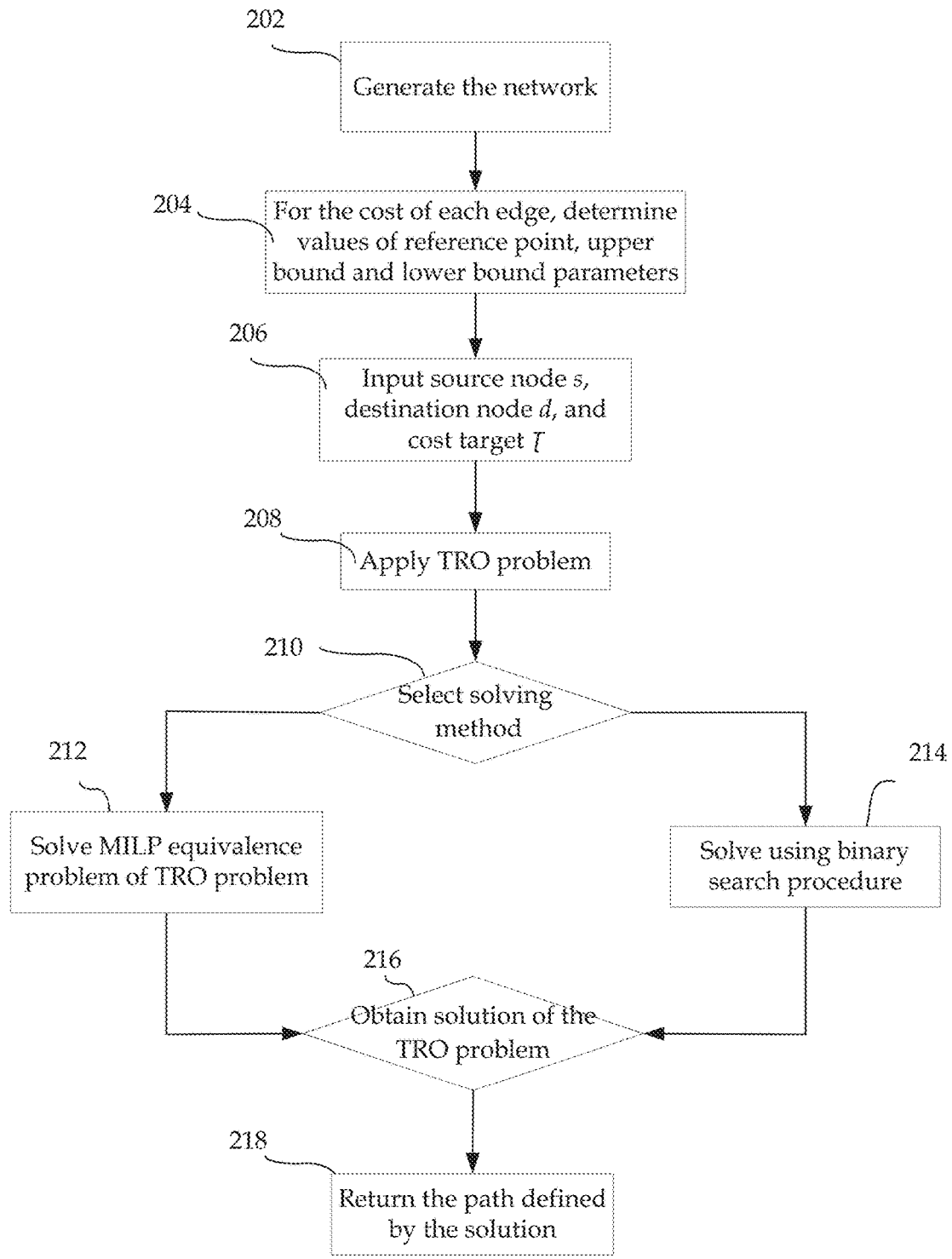
FIG. 2 shows an exemplary process for determining a path using a robust optimization technique.

FIG. 2 shows an exemplary process 200 for determining a path in a network using a robust optimization technique. In one implementation, the process uses the robust optimization technique to determine a path that satisfies a given cost target with the highest probability (or reliability). The process returns an optimal path defined by the solution of the robust optimization problem. The cost target, in one implementation, is a travel time target. Providing other types of cost target may also be useful.

At 202, the modeling unit constructs or generates a graph of the network of interest. The network, in one implementation, is a stochastic network. In one implementation, the network may be stochastic traffic network. The network may be constructed with a number of nodes and arcs (or edges) connecting the nodes to represent the traffic network. For example, the nodes may represent locations in the traffic network. The arcs may be associated with costs such as, inter alia, distance and travel time between the nodes. Depending on the application of the framework, providing other types of costs may also be useful. The costs of arcs in the stochastic network, for example, follow a certain distribution.

In one implementation, a directed network graph with N number of nodes indexed by 1, 2, . . . , N is constructed. The indexed set of nodes may be represented by a parameter $\mathcal{N}$, i.e., $\mathcal{N} = \{1, 2, \ldots, N\}$. Directed arcs connect two different nodes and $A = \{(i, j) | i, j \in \mathcal{N}\}$ is defined to represent the set of node-pairs that has an arc pointing from node i to node j. Each edge (i, j) between node i and node j in the set of node-pairs A is associated with a cost. In one implementation, each edge of the network graph is associated with a travel time cost, denoted by $\tilde{c}_{ij}$. Associating the edges with other weights may also be useful.

At 204, the modeling unit models the cost for each edge in the network graph. In one implementation, the modeling unit models the travel time cost $\tilde{c}_{ij}$ for each edge (i, j) between node i and node j. In one implementation, the modeling unit models the travel time cost $\tilde{c}_{ij}$ using lower bound $\underline{c}_{ij}$, upper bound $\overline{c}_{ij}$, and reference point (or nominal value) $\hat{c}_{ij}$ parameters. The lower bound, upper bound, and reference point parameters is used to describe the travel time uncertainty. In other words, the travel time cost $\tilde{c}_{ij}$ is described by its support set $[\underline{c}_{ij}, \overline{c}_{ij}]$ and reference $\hat{c}_{ij}$.

In one implementation, the modeling unit determines the value of the reference point $\hat{c}_{ij}$ parameter for edge (i, j) by using the mean of the sample set of travel times between node i and node j. Alternatively, the modeling unit determines the value of the reference point $\hat{c}_{ij}$ parameter for edge (i, j) by using the mode of the sample set of travel times between node i and node j. As for the lower bound and upper bound parameters, the modeling unit determines the values of the lower bound and upper bound parameters for edge (i, j) using the value of the reference point $\hat{c}_{ij}$ plus and minus triple the standard deviation of the sample set. Alternatively, the values of the lower bound and upper bound parameters for each edge (i, j) may be determined using the minimum or maximum values of the sample set. Providing other configurations or values for the lower bound $\underline{c}_{ij}$, upper bound $\overline{c}_{ij}$, and reference point $\hat{c}_{ij}$ parameters may also be useful.

The configuration of the parameters lower bound, upper bound, and reference point may be defined by a user via the user interface.

Figure 3:
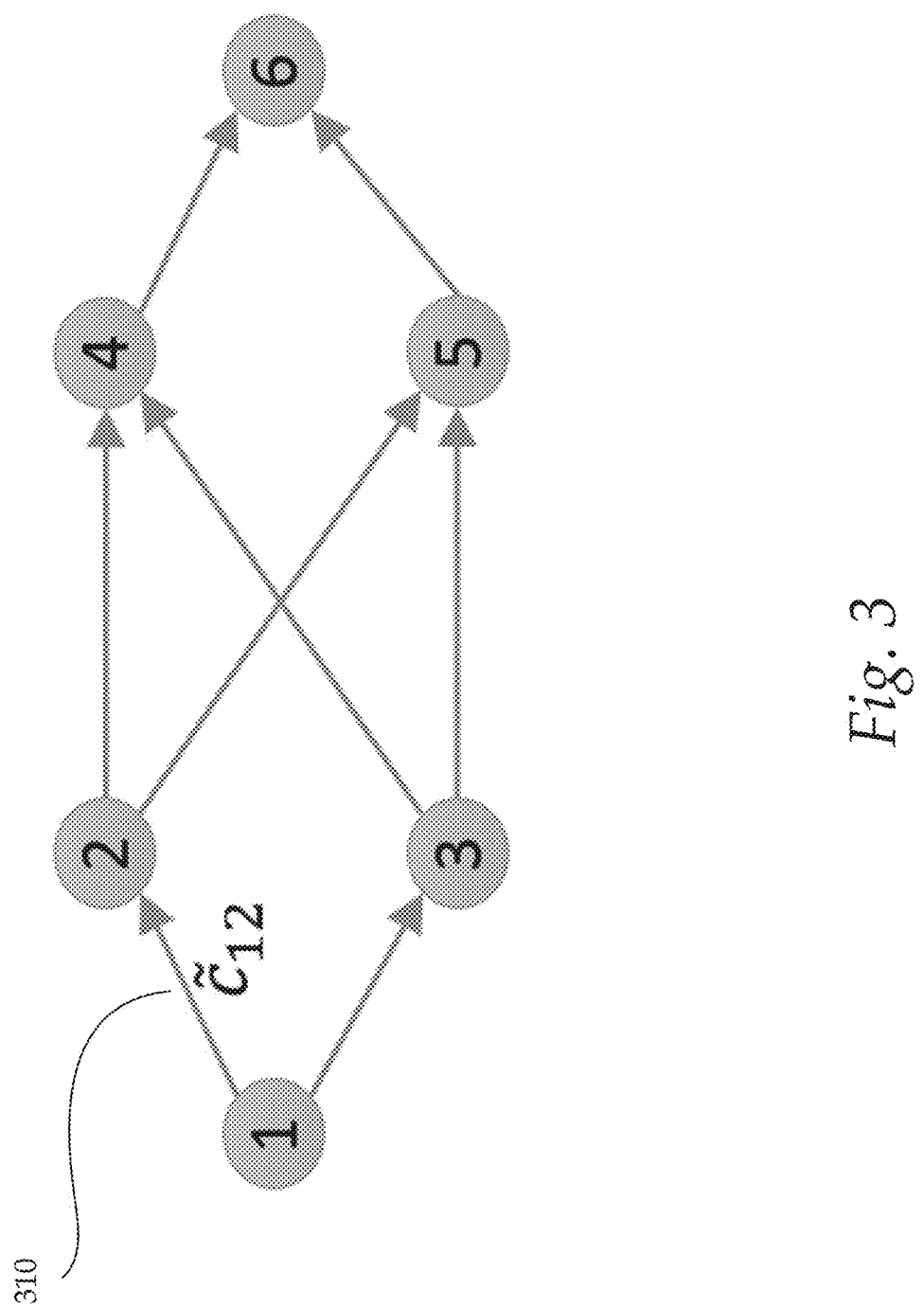
FIG. 3 shows an exemplary network graph illustrating a routing problem in a stochastic traffic network.

FIG. 3 shows an exemplary network graph 300 illustrating a routing problem in a stochastic traffic network. As illustrated in the network, $\mathcal{N}$ N={1, 2, 3, 4, 5, 6}, while A={(1, 2), (1, 3), (2, 4), (2, 5), (3, 4), (3, 5), (4, 6), (5, 6)}. In the example network, travel time cost $\tilde{c}_{12}$ associated to edge (1,2) 310 from node 1 to node 2 has 5 travel time samples, {1, 1.1, 1.1, 1.3, 1.5}. In the case where the mean of the sample set is selected to be the reference point, the value of the reference point $\hat{c}_{12}$ is 1.2. In the case where the mode of the sample set is selected to be the reference point, the value of the reference point $\hat{c}_{12}$ is 1.1. As for the support set, it may use the minimal and maximal values of the sample set as the bounds of the travel time cost (e.g., [1, 1.5]). Alternatively, the support set may use the mean plus and minus triple the standard deviation of the sample set (i.e., [0.6, 1.8]). The configuration of the parameters reference point $\hat{c}_{ij}$ and support set lower bound $\underline{c}_{ij}$ and upper bound $\overline{c}_{ij}$ may be selected depending on a user's confidence level about the data set and preference of uncertainty.

At 206, the path optimizer unit receives user input containing a starting or source node s, destination node d, and cost target. The source node s, destination node d, and cost target may be provided by a user via the user interface. The cost target, in one implementation, may be travel time target $\mathcal{T}$. The path optimizer unit uses the user input, the constructed network graph and the lower bound, upper bound and reference point parameters to determine an optimal path in the network by using a robust optimization technique. For example, the path optimizer unit determines the optimal path in response to the user input.

At 208, the path optimizer unit applies a target-oriented robust optimization (TRO) problem for determining the optimal path. In one implementation, a binary decision variable $x_{ij}$ is defined for each edge or arc (i, j)∈A of the network. A binary decision variable may take the value 1 or 0. The path optimizer unit solves the TRO problem and determines the value of the binary decision variables. If the value of the binary decision variable $x_{ij}$=1, the associated edge is in the path, i.e., part of the resultant path or route. If the value of the binary decision variable $x_{ij}$=0, the associated edge is not in the path. All the edges with associated binary decision variable $x_{ij}$=1 may form a path connecting the source and the destination.

For a set of decision variables $\{x_{ij}\}$ to describe a feasible route from the starting node s to the destination node d, the decision variables must satisfy the following constraints.

$$\Sigma_{j:(s,j)\in A} x_{sj}=1, \quad (1a)$$

$$\Sigma_{i:(i,d)\in A} x_{id}=1, \quad (1b)$$

$$\Sigma_{j:(i,j)\in A} x_{ij} \leq 1, i\in \mathcal{N} \quad (1c)$$

$$\Sigma_{i:(i,j)\in A} x_{ij} = \Sigma_{k:(j,k)\in A} x_{jk}, j\in \mathcal{N}/\{s,d\}. \quad (1d)$$

Constraint (1a) ensures that node s is the starting point of the path and multiple revisit of the same node is filtered out as it is not an optimal path. Constraint (1b) ensures that node d is the end of the path and the node is visited only once. Constraint (1c) ensures that each node is visited at most once. Constraint (1d) ensures the continuity of the path. Decision variables $\{x_{ij}\}$ satisfying Constraint (1) define a path connecting node s and node d. All such decision variables may be collected in the following set.

$$\mathbb{F}:=\{\{x_{ij}\}|x_{ij},(i,j)\in A \text{ satisfy } (1)\}. \quad (2)$$

Given a set of decision variables $\{x_{ij}\}\in \mathbb{F}$ and travel time costs $\tilde{c}_{ij}$ of arcs, the travel time $\tilde{T}$ of a resultant path (or route) may be defined as follows.

$$\tilde{T}:=\Sigma_{(i,j)\in A}\tilde{c}_{ij}x_{ij} \quad (3)$$

It is desirable to have a probability of the travel time $\tilde{T}$ of a resultant route being less than the target travel time $\mathcal{T}$ as much as possible in order to provide a reliable travel time.

In one implementation, an adjustable uncertainty set is defined for each travel time cost $\tilde{c}_{ij}$ as follows.

$$C_{ij}(\gamma):=\{\tilde{c}_{ij}|\gamma(\underline{c}_{ij}-\hat{c}_{ij})\leq \tilde{c}_{ij}-\hat{c}_{ij}\leq\gamma(\overline{c}_{ij}-\hat{c}_{ij})\}, \quad (4)$$

where $\gamma\in[0, 1]$. $\gamma$ denotes a decision variable taking a value between 0 and 1, and it represents the size of the uncertainty set $C_{ij}(\gamma)$. It can be seen that $C_{ij}(0)$ is a singleton containing the reference point only, while $C_{ij}(1)$ is the full support set of $\tilde{c}_{ij}$, and $C_{ij}(\gamma)$ is a set in between when $0<\gamma<1$. For example, if $\gamma$ is 0, the set contains only one value, while if $\gamma$ is 1, the set is a full set from the minimum value to the maximum value.

In one implementation, the path optimizer unit applies the following Target-oriented Robust Optimization (TRO) problem.

$$\max_{0\leq\gamma\leq 1}\gamma \quad (5a)$$

$$\text{s.t.}\{x_{ij}\}\in\mathbb{F} \quad (5b)$$

$$\tilde{T}<\mathcal{T}, \forall \tilde{c}_{ij}\in C_{ij}(\gamma), \forall(i,j)\in A \quad (5c)$$

where $\forall(i, j)$ denotes for all edges (i, j) in the network, and $\forall\tilde{c}_{ij}$ denotes for all possible value of travel time costs $\tilde{c}_{ij}$ in the $C_{ij}(\gamma)$ set.

Given the definition of the travel time $\tilde{T}$ of a resultant route in (3) and the adjustable uncertainty set $C_{ij}(\gamma)$ in (4), it can be observed that the travel time $\tilde{T}$ achieves its largest value when $\tilde{c}_{ij}=\hat{c}_{ij}+\gamma(\overline{c}_{ij}-\hat{c}_{ij})$. Therefore, Constraint (5c) is equivalent to $\Sigma_{(i,j)\in A}(\hat{c}_{ij}+\gamma(\overline{c}_{ij}-\hat{c}_{ij}))x_{ij}<\mathcal{T}$. Accordingly, when the travel time $\tilde{T}$ is considered at its largest value, a deterministic equivalence of the TRO problem is obtained as follows.

TRO($\{\hat{c}_{ij},\overline{c}_{ij}\}$):

$$\gamma^*=\max_{0\leq\gamma\leq 1}\gamma \quad (6a)$$

$$\text{s.t}\{x_{ij}\}\in\mathbb{F} \quad (6b)$$

$$\Sigma_{(i,j)\in A}(\hat{c}_{ij}+\gamma(\overline{c}_{ij}-\hat{c}_{ij}))x_{ij}<\mathcal{T} \quad (6c)$$

The deterministic equivalence of the TRO problem (or deterministic TRO problem), i.e., problem (6) is a Mixed Integer Programming (MIP) problem with quadratic constraints and the number of binary variables is equivalent to the number of arcs in the network. $\gamma^*$ denotes the optimal value of $\gamma$ obtained by solving Problem (6). At 210, the path optimizer unit selects a method for solving the TRO problem. In one implementation, the path optimizer unit solves the TRO problem by solving the deterministic TRO problem, i.e., problem (6). For example, the original formulation of the TRO problem as shown in problem (5) may not be directly solvable, and the path optimizer unit solves the deterministic TRO problem instead.

As the deterministic TRO problem is not directly solvable due to the bilinear term $\gamma(\overline{c}_{ij}-\hat{c}_{ij})x_{ij}$ in the last constraint (e.g., $\gamma$ and $x_{ij}$ multiples each other), auxiliary variables $\lambda_{ij}$ are introduced in one implementation. By introducing the auxiliary variables $\lambda_{ij}$, a Mixed Integer Linear Programming (MILP) equivalence of the problem (6) can be formulated as follows.

MILP($\{\hat{c}_{ij}, \bar{c}_{ij}\}$):

$$\gamma^* = \max_{0 \leq \gamma \leq 1} \gamma \quad (7a)$$

$$\text{s.t.} \{x_{ij}\} \in \mathbb{F} \quad (7b)$$

$$\Sigma_{(i,j) \in A} \lambda_{ij} \leq \underline{T} \quad (7c)$$

$$\lambda_{ij} \geq \hat{c}_{ij} + \gamma(\bar{c}_{ij} - \hat{c}_{ij}) + M(x_{ij} - 1) \quad (7d)$$

$$\lambda_{ij} \geq 0, \forall (i,j) \in A \quad (7e)$$

where M is a large value constant.

At 212, the path optimizer unit solves the TRO problem by solving the MILP equivalence, i.e., problem (7). The MILP equivalence problem may be solved directly by any MILP solver (e.g., CPLEX (commercial solver), Gurobi (open source solver)). It should be appreciated that solving the MILP equivalence problem (7) may take a while if the network is relatively large since Integer Programming is an NP-complete (nondeterministic polynomial time) problem.

In some implementations, the deterministic equivalence of the TRO problem (i.e., problem 6) can be solved by performing a binary search over γ and solving the following deterministic (DP) problem (8) repeatedly.

DP($\{\hat{c}_{ij}\}$):

$$\min \Sigma_{(i,j) \in A} \hat{c}_{ij} x_{ij} \quad (8a)$$

$$\text{s.t.} \{x_{ij}\} \in \mathbb{F} \quad (8b)$$

The procedure is summarized in Algorithm 1 as shown in FIG. 4. At 214, the path optimizer unit solves the TRO problem using the binary search (BS) procedure $TRO_{BS}$ as shown in algorithm 1. In Algorithm 1, the travel time target $\underline{T}$ and the maximal number of iteration $i_{max}$ are the input parameters. For example the input parameters may be provided by a user via the user interface. i denotes the number of iteration, LB denotes the lower bound of γ while UB denotes the upper bound of γ. At line 2, the procedure initializes the value of LB, UB and i.

Figure 7:
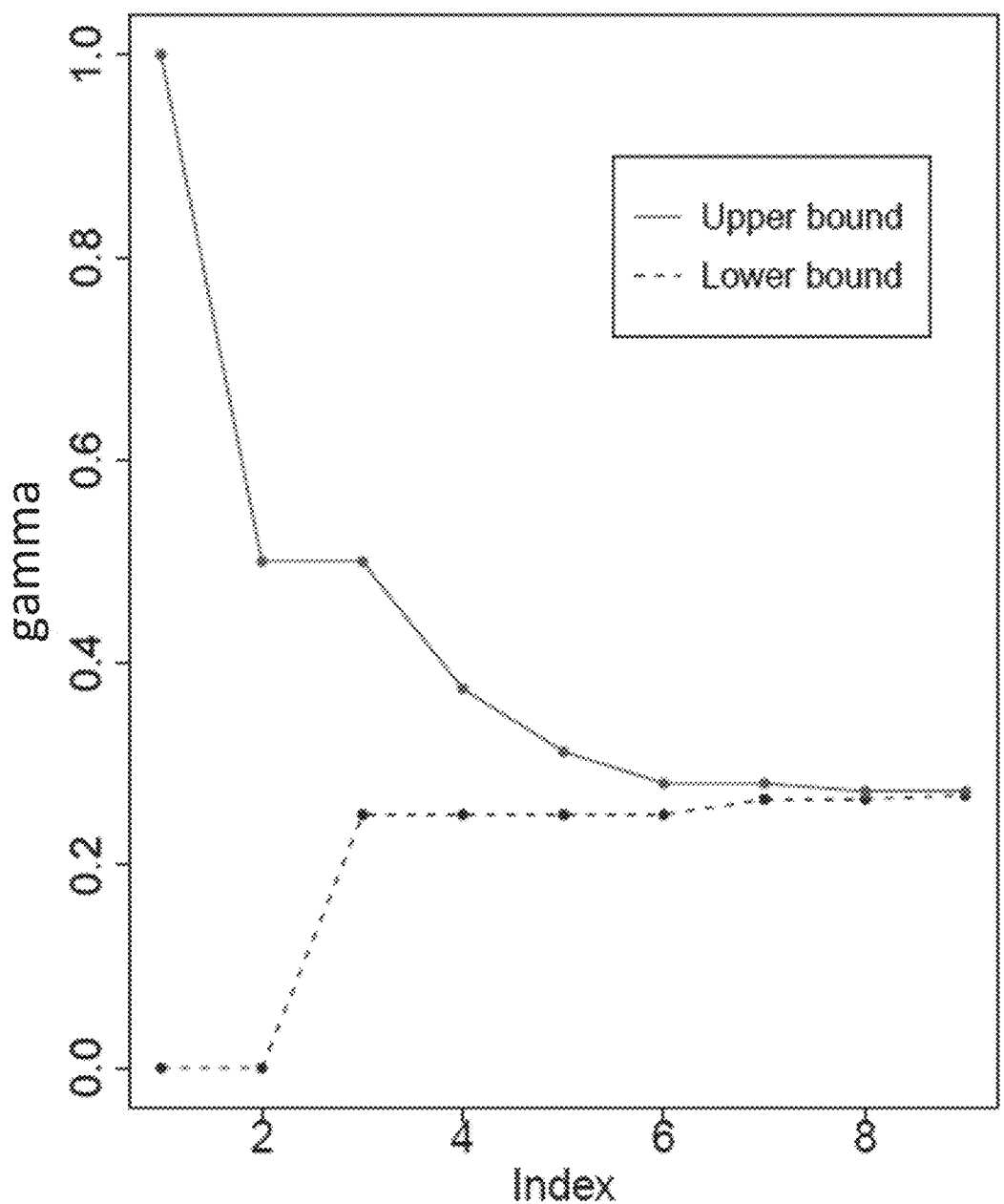
FIG. 7 illustrates the trajectory of the lower and upper bounds of $\gamma$ using the binary search procedure for solving a TRO problem.

Lines 3 to 4 show the optimizer unit checking whether γ=0 is a feasible solution. If it is infeasible, then the TRO Problem (5) is infeasible. Lines 5-6 show the optimizer unit checking whether γ=1 is a feasible solution. If it is feasible, then γ=1 is optimal for the TRO Problem (5). Lines 7-9 show the optimizer unit performing the binary search. The optimizer unit keeps checking whether the (LB+UB)/2 is feasible for γ. In the binary search process, UB stores the infeasible value for γ, while LB stores the feasible value for γ. As the processing evolves, LB and UB will converge as shown in FIG. 7, and both will converge to γ*. The procedure $TRO_{BS}(\underline{T}, i_{max})$ returns the value of γ* with arbitrary accuracy. For example, when $i_{max}$=10 the accuracy is $\frac{1}{2}^{10}$ which is less than 0.001. However, it is found from experiment results that 7 is a good choice for $i_{max}$ in practice.

In one implementation, the deterministic problem (8) in line 8 may be solved using Dijkstra's algorithm as the deterministic problem is in the form that can be solved directly using Dijkstra algorithm. For example, the deterministic problem may be solved using existing Dijkstra's algorithm including traditional Dijkstra algorithm and its variants. The time complexity is O(|E|+|V|log |V|) based on min-priority queue implemented by a Fibonacci heap. The time complexity of the binary search is only several times of Dijkstra's algorithm and may be suitable to solve problems of realistic sizes. An exemplary numerical experiment of the binary search and solving of the DP problem will be described later.

Accordingly, the TRO problem need not necessarily be solved. It should be appreciated that the solution of the TRO problem may be obtained by performing a binary search procedure and solving the deterministic problem (8) repeatedly using existing algorithms such as Dijkstra's algorithm. Solving the TRO problem generates the values of the binary decision variables $x_{ij}$ of the edges. At 216, the path optimizer unit obtains the solution of the TRO problem. If the value of the binary decision variable of an edge (i, j) is 1, then the edge (i, j) is part of the resultant path, otherwise it is not. At 218, the path optimizer unit returns the path defined by the solution. The path generator outputs the path as a recommended optimal route in the traffic network given the source node, destination node and travel time target. The recommended route may be provided to the user via the user interface of the client device.

The robust optimization technique is computationally amiable and its solution can be obtained efficiently by leveraging existing algorithms. In addition, it does not require the distribution information of the uncertainty (e.g., travel time uncertainty), and only make use of the selected reference point and bounds of the sample set. Accordingly, the performance of the solution is quite robust against distributional ambiguity.

A numerical experiment was performed to illustrate the advantages of the solving the TRO problem in comparison with other approaches for determining an optimal path in a network. In a first experiment, a directed lattice graph is generated with nominal travel time of each arc independent and uniformly distributed between 10 and 25. For each arc, the travel time is associated with an uncertainty which is a percentage of the nominal travel time and its value is uniformly distributed between 20% and 50%. This means the upper bound and the lower bound are the nominal travel time plus and minus the corresponding uncertainty. Therefore, it should be noted that the uncertainty described in this example is different from the variance of the travel time.

Figure 5A:
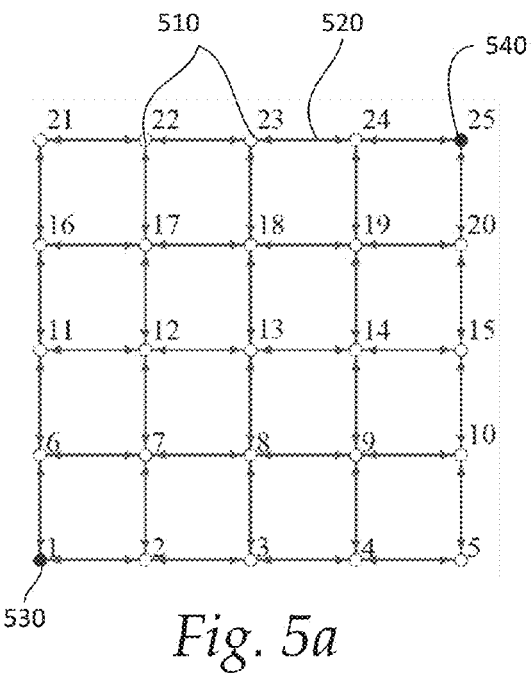
FIGS. 5a-5d show exemplary lattice graphs generated in an experiment for determining a route using the robust optimization technique.
Figure 5B:
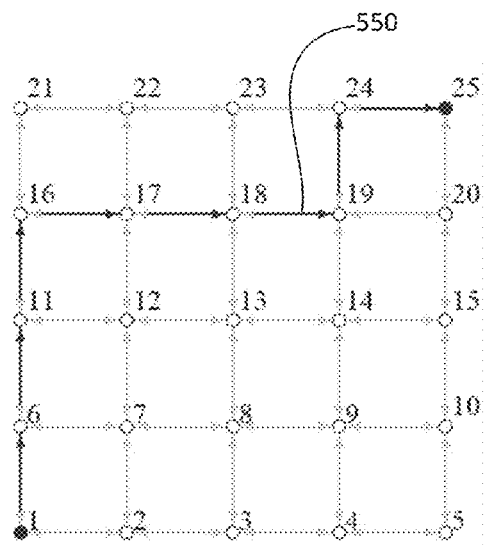
Figure 5C:
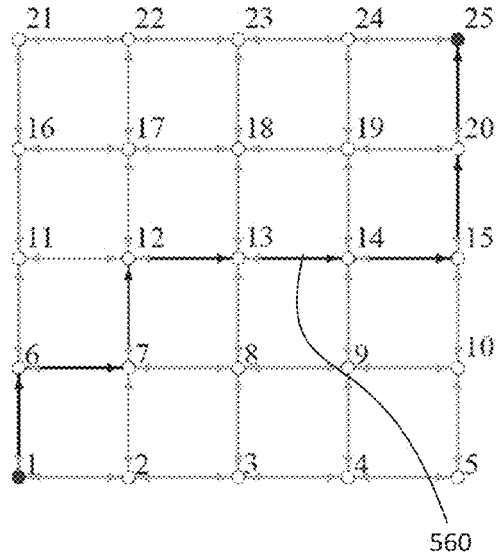
Figure 5D:
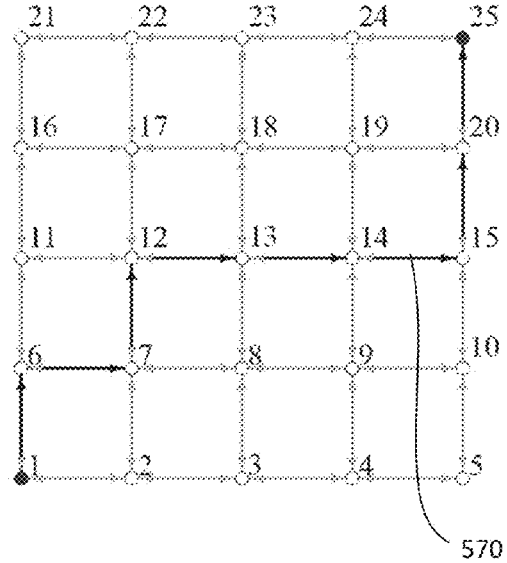

FIGS. 5a-5d show exemplary lattice graphs generated in the experiment for determining a route using the robust optimization technique. FIG. 5a shows the constructed lattice graph with all nodes and edges, for example, in a traffic network of interest and FIGS. 5b-5d show routes determined by solving a DP, MITT equivalence of the TRO problem and binary search procedure of the TRO problem respectively. The graphs are a 5*5 lattice graph. The numbered vertexes or nodes 510, for example, represent points in a traffic network. Edges or arcs 520 connect the nodes. Vertex 1 530 (lower left corner) is the departure point, and Vertex 25 540 (upper right corner) is the destination point. It should be appreciated that in FIGS. 5b-5d, the variable $x_{ij}$=1 for all the edges that are part of the resultant route, and $x_{ij}$=0 for all other edges which are not part of the resultant route.

For this problem instance, if the uncertainties are ignored and only a deterministic problem is solved using the nominal travel time, a DP route 550 as shown in FIG. 5b is obtained. On the other hand, if the travel time target is set as 192 which is around 80% of the longest travel time of the DP route and the uncertainties are considered in the decision making process, solving the MILP equivalence problem of the TRO problem determines a TRO route 560 as shown in FIG. 5c. It can be observed from the figures that the two routes with and without considering the travel time uncertainties are quite different from each other.

The total travel time distribution of the two routes is further compared to show the differences of the routes determined by DP and TRO approaches. In order to get the travel time distribution, the travel times of different arcs are assumed to be independent of each other and follow beta distributions. For each beta distribution, parameters α and β are chosen. The parameters α and β are chosen to be equal so that the mean is in the mid-point of the range and is consistent with the description above. As long as α=β, the mean of beta distribution is 0.5 and does not change with α and β. The values of the two parameters are randomly chosen to follow a uniform distribution between 0 and 2.

Figure 6:
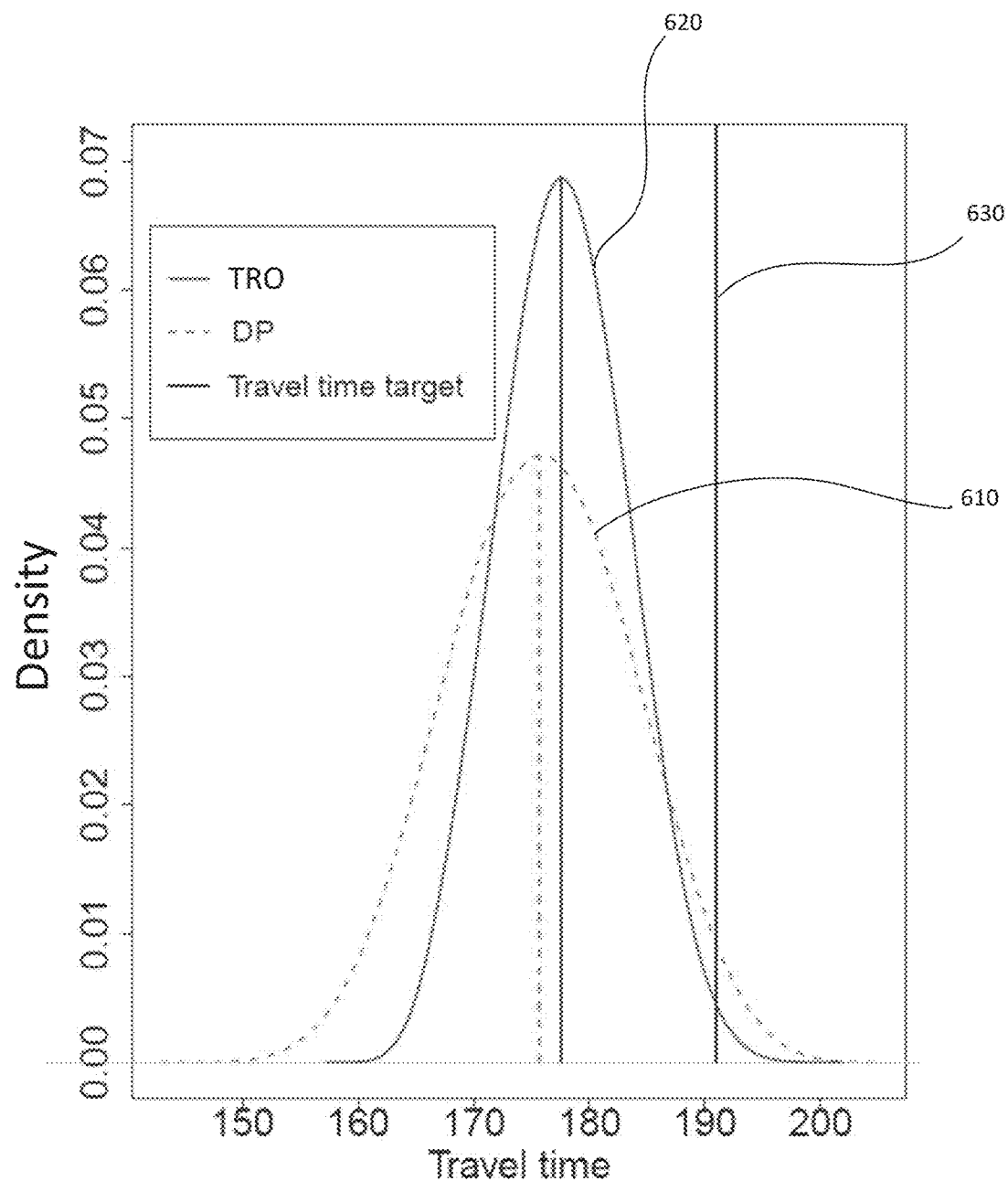
FIG. 6 shows exemplary resultant distributions of total travel times of two different routes determined by solving a deterministic problem and a TRO problem.

FIG. 6 shows resultant distributions of total travel times of the two routes. The dashed curve 610 and the solid curve 620 show the distribution of the total travel time of DP route in FIG. 5b and TRO route in FIG. 5c respectively. The straight solid line 630 shows the travel time target $\bar{T}$ used in the calculations of the MILP equivalence of the TRO problem. It can be observed in FIG. 6 that the DP route has lower mean travel time, but has a high probability to result in a long travel time. On the other hand, the TRO route can meet the travel time target with a high probability by compromising the mean travel time just a little. In practice, most travelers would prefer the TRO route to meet certain travel time target.

Returning to FIG. 5 for the problem instance shown in FIG. 5a, the trajectory of the lower and upper bounds of γ using the binary search procedure in Algorithm 1 is shown in FIG. 7 and the resultant route 570 of the binary search procedure is shown in FIG. 5d. FIG. 7 shows how LB and UB in Algorithm 1 are updated and converge to γ*. It can be seen that the binary search procedure for a solution of the TRO problem determines the same route as the MILP equivalence of the TRO problem for this problem instance. It should be appreciated that solving the TRO problem (5) using the binary search procedure and the MILP equivalence problem generates the same solution. The performance of the binary search is further tested using other random generated instances. For all instances, $i_{max}=7$ is chosen for the binary search procedure. The results show that in this case, the binary search procedure always determines the same route as the MILP formulation, suggesting that 7 is a good value for $i_{max}$.

In one implementation, solving the TRO problem using the binary search procedure is found to be advantageous over solving MILP equivalence problem directly. In an experiment, ten 5*5 lattice graph instances are randomly generated, and the average time for solving the TRO problem using the binary search procedure and MILP equivalence problem are compared. The average computation time of binary search procedure is 0.25 sec, while that for solving the MILP equivalence is 13.78 sec. For 6*6 lattice graph instances, the result is 0.25 sec versus 187.03 sec. As the problem size becomes larger, the binary search procedure does not take much more time to solve, while the MILD equivalence is already unsolvable.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method for determining a path in a network, comprising:

generating, using data derived from sensors on each of a plurality of vehicles, a network graph of the network, wherein the network graph comprises nodes corresponding to points in the network, and edges connecting the nodes;

determining costs for each edge of the network, wherein determining the costs comprises modeling the costs of the edges using reference point, upper bound and lower bound parameters;

receiving user input from a client device, wherein the user input includes a source node, destination node, and cost target;

determining a resultant path connecting the source node and destination node by solving a target-oriented robust optimization problem, wherein solving the target-oriented robust optimization problem comprises optimizing a cost of the resultant path based on the modeled costs of the edges; and displaying the resultant path on a user interface of the client device;

wherein solving the target-oriented robust optimization problem comprises defining an adjustable uncertainty set $c_{ij}(\gamma)$ for each cost $\tilde{c}_{ij}$ associated to an edge (i, j) of the network using:

$$c_{ij}(\gamma) := \{\tilde{c}_{ij} | \gamma(\underline{c}_{ij} - \hat{c}_{ij}) \le \tilde{c}_{ij} - \hat{c}_{ij} \le \gamma(\overline{c}_{ij} - \hat{c}_{ij})\}$$

where γ∈[0, 1], γ denotes a decision variable taking a value between 0 and 1, and represents the size of the uncertainty set, $\hat{c}_{ij}$ denotes the reference point parameter, $\underline{c}_{ij}$ denotes the lower bound parameter and $\overline{c}_{ij}$ denotes the upper bound parameter;

wherein the network is a traffic network, the nodes represent locations in the traffic network and the cost target is a travel time target.

2. The computer-implemented method of claim 1 wherein the value of the reference point parameter for an edge (i,j) is the mean of a sample set of travel times between node i and node j.

3. The computer-implemented method of claim 2 wherein the values of the upper bound and lower bound parameters for an edge (i, j) is the reference point plus and minus triple the standard deviation of the sample set of the travel times between the node i and node j.

4. The computer-implemented method of claim 1 wherein solving the target-oriented robust optimization problem comprises solving a deterministic equivalence problem of the target-oriented robust optimization problem, wherein a total cost of the resultant path does not exceed a user specified maximum value in the cost target.

5. The computer-implemented method of claim 4 wherein solving the deterministic equivalence problem of the target-oriented robust optimization problem further comprises solving a mixed integer linear programming equivalence problem of the target-oriented robust optimization problem.

6. The computer-implemented method of claim 1 wherein solving the target-oriented robust optimization problem comprises performing a binary search over γ and solving a deterministic problem repeatedly.

7. The computer-implemented method of claim 6 wherein solving the deterministic problem comprises using Dijkstra's algorithm.

8. The computer-implemented method of claim 6 wherein solving the deterministic problem comprises providing the cost target and maximal number of iteration as input parameters to a binary search procedure.

9. The computer-implemented method of claim 1 wherein optimizing the cost of the resultant path comprises determining that the cost of the resultant path is less than the cost target.

10. The computer-implemented method of claim 1 further comprising defining a binary decision variable for each edge of the network graph and solving the target-oriented robust optimization problem to determine the values of the binary decision variables.

11. A path determination system, comprising:
a non-transitory memory device for storing computer-readable program code; and
a processor in communication with the memory device, the processor being operative with the computer-readable program code to
generate, using data derived from sensors on each of a plurality of vehicles, a network graph of a traffic network, wherein the network graph comprises nodes corresponding to locations in the traffic network, and edges connecting the nodes;
determine travel time costs for each edge of the network, wherein determining the travel time costs comprises modeling the travel time costs of the edges using reference point, upper bound and lower bound parameters;
receive user input from a client device, wherein the user input includes a source node, destination node, and travel time target;
determine a resultant path connecting the source node and destination node by solving a target-oriented robust optimization problem, wherein solving the target-oriented robust optimization problem comprises optimizing a travel time cost of the resultant path based on the modeled costs of the edges; and
display a route defined by the resultant path on a user interface of the client device;
wherein solving the target-oriented robust optimization problem comprises defining an adjustable uncertainty set $c_{ij}(\gamma)$ each cost $\tilde{c}_{ij}$ associated to an edge (i,j) of the network using:

$$c_{ij}(\gamma) := \{\tilde{c}_{ij} | \gamma(\underline{c}_{ij} - \hat{c}_{ij}) \leq \tilde{c}_{ij} - \hat{c}_{ij} \leq \gamma(\overline{c}_{ij} - \hat{c}_{ij})\}$$

where $\gamma \in [0, 1]$, $\gamma$ denotes a decision variable taking a value between 0 and 1, and represents the size of the uncertainty set, $\hat{c}_{ij}$ denotes the reference point parameter, $\underline{c}_{ij}$ denotes the lower bound parameter and $\overline{c}_{ij}$ denotes the upper bound parameter.

12. The system of claim 11 wherein solving the target-oriented robust optimization problem comprises solving a mixed integer linear programming equivalence of the target-oriented robust optimization problem.

13. The system of claim 11 comprising determining the solution of the robust optimization problem by performing a binary search over $\gamma$ and solving a deterministic problem repeatedly.

14. A non-transitory computer-readable medium having stored thereon a program code, the program code executable by a computer for determining a route in traffic network, comprising:
generating, using real time data derived from each of commuters in real-time, a network graph of the traffic network, wherein the network graph comprises nodes corresponding to locations in the traffic network, and edges connecting the nodes;
determining travel time costs for each edge of the network, wherein determining the travel time costs comprises modeling the travel time costs of the edges using reference point, upper bound and lower bound parameters;
receiving user input from a client device, wherein the user input includes a source node, destination node, and travel time target;
determining a resultant path connecting the source node and destination node by solving a target-oriented robust optimization problem, wherein solving the target-oriented robust optimization problem comprises optimizing a travel time cost of the resultant path based on the modeled costs of the edges; and
displaying a route defined by the resultant path on a user interface of the client device;
wherein solving the target-oriented robust optimization problem comprises defining an adjustable uncertainty set $c_{ij}(\gamma)$ each cost $\tilde{c}_{ij}$ associated to an edge (i,j) of the network using:

$$c_{ij}(\gamma) := \{\tilde{c}_{ij} | \gamma(\underline{c}_{ij} - \hat{c}_{ij}) \leq \tilde{c}_{ij} - \hat{c}_{ij} \leq \gamma(\overline{c}_{ij} - \hat{c}_{ij})\}$$

where $\gamma \in [0, 1]$, $\gamma$ denotes a decision variable taking a value between 0 and 1, and represents the size of the uncertainty set, $\hat{c}_{ij}$ denotes the reference point parameter, $\underline{c}_{ij}$ denotes the lower bound parameter and $\overline{c}_{ij}$ denotes the upper bound parameter.

15. The non-transitory computer readable medium of claim 14 wherein solving the target-oriented robust optimization problem comprises solving a mixed integer linear programming equivalence problem of the target-oriented robust optimization problem.

16. The non-transitory computer readable medium of claim 14 comprising determining the solution of the robust optimization problem by performing a binary search over y and solving a deterministic problem repeatedly.

* * * * *